United States Patent
Rosen et al.

(10) Patent No.: US 7,215,684 B1
(45) Date of Patent: May 8, 2007

(54) METHOD AND APPARATUS FOR REDUCING TRANSMISSION OVERHEAD IN A COMMUNICATION SYSTEM

(75) Inventors: Eric Rosen, Solana Beach, CA (US); Mark Maggenti, San Diego, CA (US); James Tomcik, Carlsbad, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 09/665,743

(22) Filed: Sep. 20, 2000

(51) Int. Cl.
*H04J 3/18* (2006.01)
(52) U.S. Cl. .................................................. 370/477
(58) Field of Classification Search ..... 370/310–310.2, 370/328, 338, 345, 349, 351, 389, 395.1, 370/396–397, 395.5, 395.52, 395.54, 400–401, 370/464–466, 474, 352, 355, 392, 469, 475–477, 370/473
See application file for complete search history.

(56) References Cited

U.S. PATENT DOCUMENTS

| | | | | |
|---|---|---|---|---|
| 5,406,550 | A * | 4/1995 | McTiffin | 370/335 |
| 5,867,782 | A * | 2/1999 | Yoon | 455/421 |
| 5,953,322 | A * | 9/1999 | Kimball | 370/328 |
| 6,466,585 | B1* | 10/2002 | Le | 370/465 |
| 6,584,098 | B1* | 6/2003 | Dutnall | 370/354 |
| 6,735,190 | B1* | 5/2004 | Chuah et al. | 370/352 |
| 2002/0001315 | A1* | 1/2002 | Tran et al. | 370/475 |
| 2002/0064164 | A1* | 5/2002 | Barany et al. | 370/401 |

OTHER PUBLICATIONS

V. Jacobson; Network working Group; "Compressing TCP/IP Headers for Low-Speed Serial Links"; RFC 1144; Feb. 1990; pp. 1-46.
S. Casner; Networking Group; Cisco Systems V. Jacobson Cisco Systems; "Compressing IP/UDP/RTP Headers for Low-Speed Serial Links"; Feb. 1999; pp. 1-24.
XP002125101 Casner S. et al.: "Compressing IP/UDP/RTP Headers for Low-Speed Serial Links," IETF-Internet Draft, Jul. 27, 1998, p. 4, line 14, paragraph 3.1- p. 6, line 37, paragraph 3.3.
XP002901751 Burmeister C. et al.: "Robust Header Compression (ROHC)," Internet Draft, Dec. 2000, pp. 1-122, abstract p. 4, line 1, paragraph 1. -p. 6, line 17, paragraph 2, p. 11, line 1 paragraph4, p. 16, paragraph 4.4.3 -p. 18, paragraph 4.5.
XP002932490 M. Degermark: "IP Header Compression," IETF RFC 2507, Feb. 1, 1999, pp. 1-31, abstract p. 3, line 40 -p. 4, line 9, p. 5, line 27 -p. 6, line 18, p. 8, paragraph 3.3.2 -paragraph 3.3.3, p. 10, line 19, paragraph 4. -p. 13, line 23, paragraph 5.3.1.

* cited by examiner

*Primary Examiner*—Kevin C. Harper
(74) *Attorney, Agent, or Firm*—Thomas Rouse; Sandip (Micky) Minhas; Dang M. Vo

(57) ABSTRACT

A method and apparatus for reducing transmission overhead in a wireless communication system. In one embodiment, the apparatus is directed to a communication device comprising a processor for transmitting a data origination message, the data origination message initiating a data communication with a receiving station. Information needed to construct datagrams are also transmitted by the apparatus to the receiving station. The receiving station receives the data origination message and the information needed to construct datagrams and configures a packet data generator for sending datagrams to a destination device. Data network header information is constructed from information provided by the information needed to construct datagrams.

11 Claims, 6 Drawing Sheets

METHOD AND APPARATUS FOR REDUCING TRANSMISSION OVERHEAD IN A COMMUNICATION SYSTEM

BACKGROUND OF THE INVENTION

I. Field of the Invention

The present invention relates generally to a data communication system in which data packets are sent over a wireless medium to one or more recipients. More particularly, this invention relates to a system and method for eliminating header information in data packets during wireless transmission and re-constructing the data packets for delivery across a data network.

II. Description of the Related Art

The transmission of data packets over a network has been a mainstay of computer technology for many years and the communication protocols used to transmit these data packets over various networks are well established. Under conventional communication protocols, it is common for a client to initiate connection with a server and to request desired data from the server. As part of the request, the client sends information pertaining to how the data should be sent. For example, the client might include a client address, TCP port number, and so forth.

Digital data, whether transmitted over a wire-based distribution network (e.g., local area network, wide area network, cable, etc.) or a wireless distribution network (e.g., satellite, cellular, RF, paging, etc.), is typically packetized and sent over the network in individual packets. Some protocols call for fixed size packets, while other protocols utilize variable size packets. To improve transmission efficiency and to keep pace with the exploding demand for digital information, there is a constant design objective to pump increasingly more data through the same bandwidth pipeline over any given network.

One way to achieve this objective is through packet compression. Packets may be compressed at a server, transmitted in their compressed state over a network, and decompressed at a client. Apart from compressing whole packets, another solution is partial packet compression in which portions of the packet, such as a header or a data payload, are compressed.

One technique for compressing packet headers is discussed in an article by V. Jacobson, entitled "Compressing TCP/IP Headers for Low-Speed Serial Links,". The Jacobson technique provides an elaborate and complex compression scheme that reduces a 40-byte TCP/IP (Transmission Control Protocol/Internet Protocol) packet header to a three-byte compressed header. The compressed header has an encoded change to the packet ID, a TCP checksum, a connection number, and a change mask. The hardware and/or software used to implement the Jacobson technique must perform sophisticated computations that compress the 40-byte header to the three-byte compressed header, and then subsequently decompress the compressed header to reproduce the uncompressed header.

Another technique for compressing packet headers is discussed in an article by S. Casner and V. Jacobson, entitled "Compressing IP/UDP/RTP Headers for Low-Speed Serial Links." This technique reduces the 40-byte IP/UDP/RTP (Internet Protocol, User Datagram Protocol, Real-Time Protocol) header to an average of between 2 and 4 bytes generally by transmitting second order differences when one or more fields within the header change.

In a wireless data communication system, real-time data, such as voice or video information, may be transmitted using the data protocols discussed above. In this kind of application, delays between a transmitter and a receiver may result in unacceptable distortion of the information being transmitted. This delay, know commonly as latency, can be minimized by reducing the overhead associated with data packets during transmission. However, using the above techniques still results in a large transmission overhead of header information relative to the data being transmitted.

An additional drawback of the above header-compression techniques is that information must occasionally be transmitted from the receiver to the transmitter to alert the transmitter that an error has occurred. In this case, either the transmitter must re-transmit the lost or corrupted data or an update of header information must be re-transmitted to the receiver. This process produces an unacceptable amount of latency in real-time or near real-time applications.

Consequently, there is a need to further reduce the size of headers associated with packet data, especially in real-time applications such as the transmission of audio and video signals.

SUMMARY OF THE INVENTION

The present invention is directed to a system and method for reducing transmission overhead in a communication system. In one embodiment, the present invention is directed to an apparatus for reducing transmission overhead in a communication system, the apparatus comprising a processor for generating a data origination message, the data origination message initiating a data communication with a receiving station. The processor further transmits information needed to construct data network header information at the receiving station, and for subsequently formatting information to be transmitted in accordance with a pre-determined format, the pre-determined format lacking data network header information. The apparatus further comprises a transmitter for transmitting the data origination message, the information needed to construct data network header information at the receiving station, and the formatted information to said receiving station.

At the receiving station, the data origination message and the information needed to construct data network header information is received, and the information needed to construct data network header information is stored in a storage device. A processor at the receiving station then configures a data packet generator to send datagrams to a destination data network address. Formatted data received from the wireless communication device is then provided to the data packet generator where it is converted into datagrams complete with any necessary data network header information, and then transmitted across a data network to a desired data device.

In another embodiment, the present invention is directed to a method for reducing transmission overhead in a communication system, comprising the steps of generating a data origination message, the data origination message initiating a data communication with a receiving station. Information needed to construct data network header information at said receiving station is then transmitted to the receiving station, as well as the data origination message. Information to be transmitted is then formatted in accordance with a pre-determined data format, the pre-determined data format lacking data network header information. The formatted data is then transmitted to the receiving station.

The data origination message and information needed to construct data network header information is received by a processor located at the receiving station. The information needed to construct data network header information is stored in a storage device. The processor then configures a data packet generator to generate datagrams to a destination data network address. Formatted data received from the wireless communication device is then provided to the data packet generator, where it is converted into datagrams suitable for transmission across a data network to a data device associated with the destination data network address.

An advantage of the method and apparatus for reducing transmission overhead in a communication system is that header information associated with one or more data protocols does not need to be transmitted by the wireless communication device when engaged in data communications.

Another advantage of the method and apparatus for reducing transmission overhead in a communication system is a reduction in bandwidth necessary to transmit information. This results in either higher data rates or an increased number of users over a given bandwidth.

Yet another advantage of the method and apparatus for reducing transmission overhead in a communication system is that latency is reduced for real-time applications, such as voice or video.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is directed to a system and method for reducing transmission overhead in a communication system. Although one embodiment of the present invention is described herein with respect to a wireless terrestrial communication system, it should be understood that other embodiments are possible, including use in a satellite communication system, or in a wire-based communication system as well.

Figure 1:
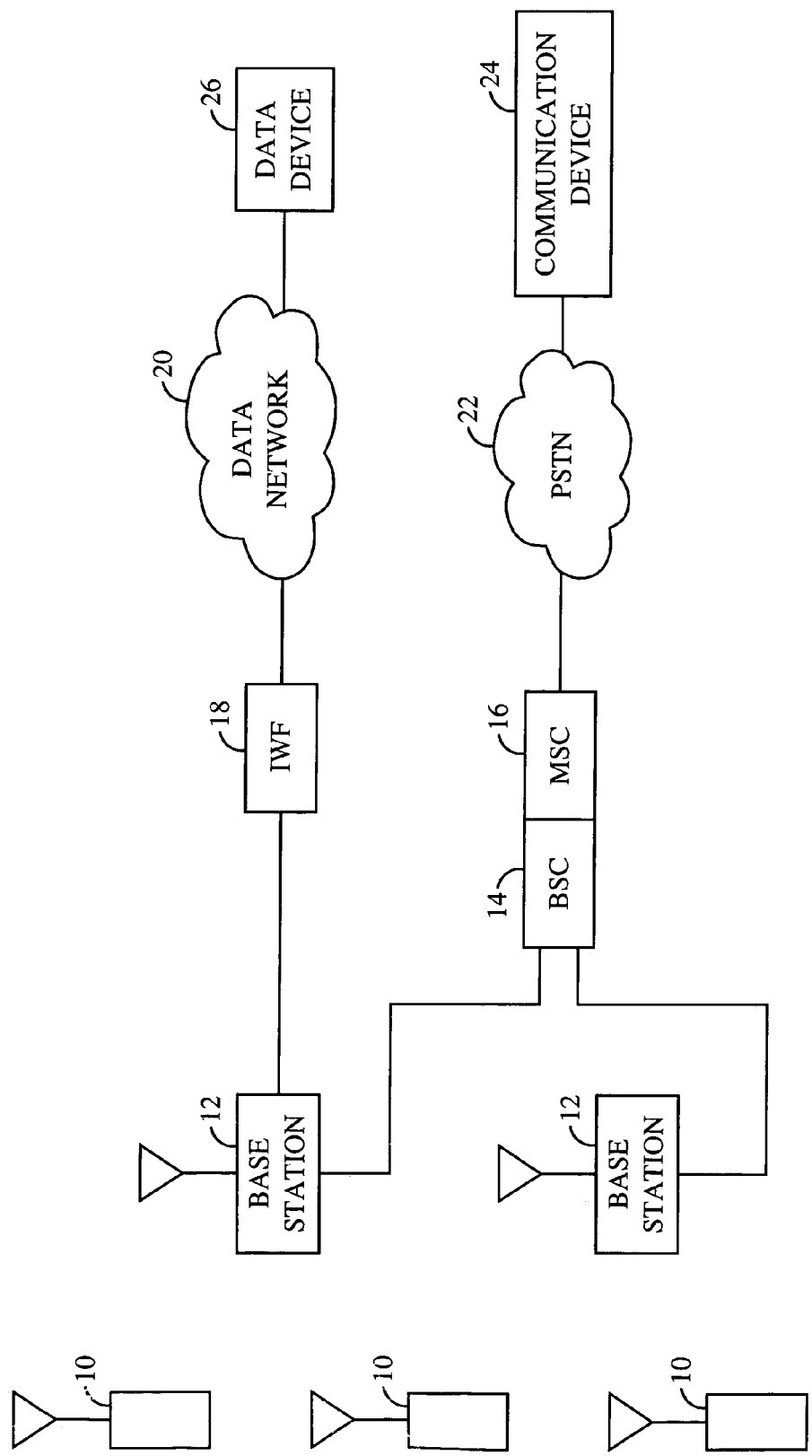
FIG. 1 illustrates a typical wireless terrestrial communication system used in conjunction with the method and apparatus for reducing transmission overhead.

FIG. 1 illustrates a typical wireless terrestrial communication system comprising a plurality of wireless communication devices (WCDs) 10, a plurality of receiving stations, or base stations, 12, a base station controller (BSC) 14, a mobile switching center (MSC) 16, and an InterWorking Function (IWF) 18. Wireless communication device 10 is typically a wireless telephone, although wireless communication device 10 could alternatively comprise a personal data assistant (PDA), a computer equipped with a wireless modem, or any other device capable of transmitting and receiving information to another communication device. Base station 12, while shown in FIG. 1 as a fixed base station, might alternatively comprise a mobile communication device, a satellite, or any other device capable of transmitting and receiving communications from wireless communication device 10.

MSC 16 is configured to interface with a conventional public switched telephone network (PSTN) 22. IWF 18 is configured to communicate with data network 20, such as the Internet. MSC 16 is also configured to interface with BSC 14. BSC 14 is coupled to each base station 12 via backhaul lines. The backhaul lines may be configured in accordance with any of several known interfaces including E1/T1, ATM, or IP. It is to be understood that there can be more than one BSC 14 in the system. Each base station 12 may include one or more sectors, each sector comprising an antenna pointed in a particular direction radially away from base station 12. Alternatively, each sector may comprise two antennas for diversity reception.

During typical operation of the wireless communication system shown in FIG. 1, base stations 12 receive information from WCDs 10 using a reverse link and transmit information to WCDs 10 using a forward link. The WCDs 10 communicate with base stations 12 using one or more service options defined and made available by a wireless service provider. For example, a voice service option may be defined which allows typical voice conversations to take place using known modulation techniques and protocols. A data service option may be defined which allows the transmission of data, including data files and email, among other data types. Additionally, another data service may be defined as a combination of the voice service option and the data service option. The combined service option is described herein as a voice-over-data (VOD) service option which allows the transmission of real-time media, such as voice or video signals, using data protocols suitable for transmission over a data network, such as the Internet.

In each of the above cases, reverse link signals received by a given base station 12 are processed within that base station 12. The resulting data is forwarded to BSC 14, in the case of a voice service call, or to IWF 18 in the case of a data or VOD service call. BSC 14 provides call resource allocation and mobility management functionality including the orchestration of soft handoffs between base stations 12. BSC 14 also routes the received data to MSC 16 where it is forwarded to PSTN 22 and onto a desired communication device 24, such as a telephone. In the case of a data service call or a VOD call, data packets are routed from IWF 18 through data network 20 and then to a desired data device 26, such as a computer, audio recording device, video recording device, or any other device which can receive data packets across data network 20. Alternatively, voice calls from WCD 10 may be routed to a second WCD 10, or even to data device 26 if the signal from WCD 10 is converted into data packets suitable for transmission across data network 20. Similarly, data service calls and VOD calls may be routed to a second WCD 10, or to communication device 24, if the data packets received by BSC 14 are converted to produce a signal suitable for transmission across PSTN 22. It should be understood that the term "data packet" and "datagram" are used interchangeably throughout this specification.

Figure 2:
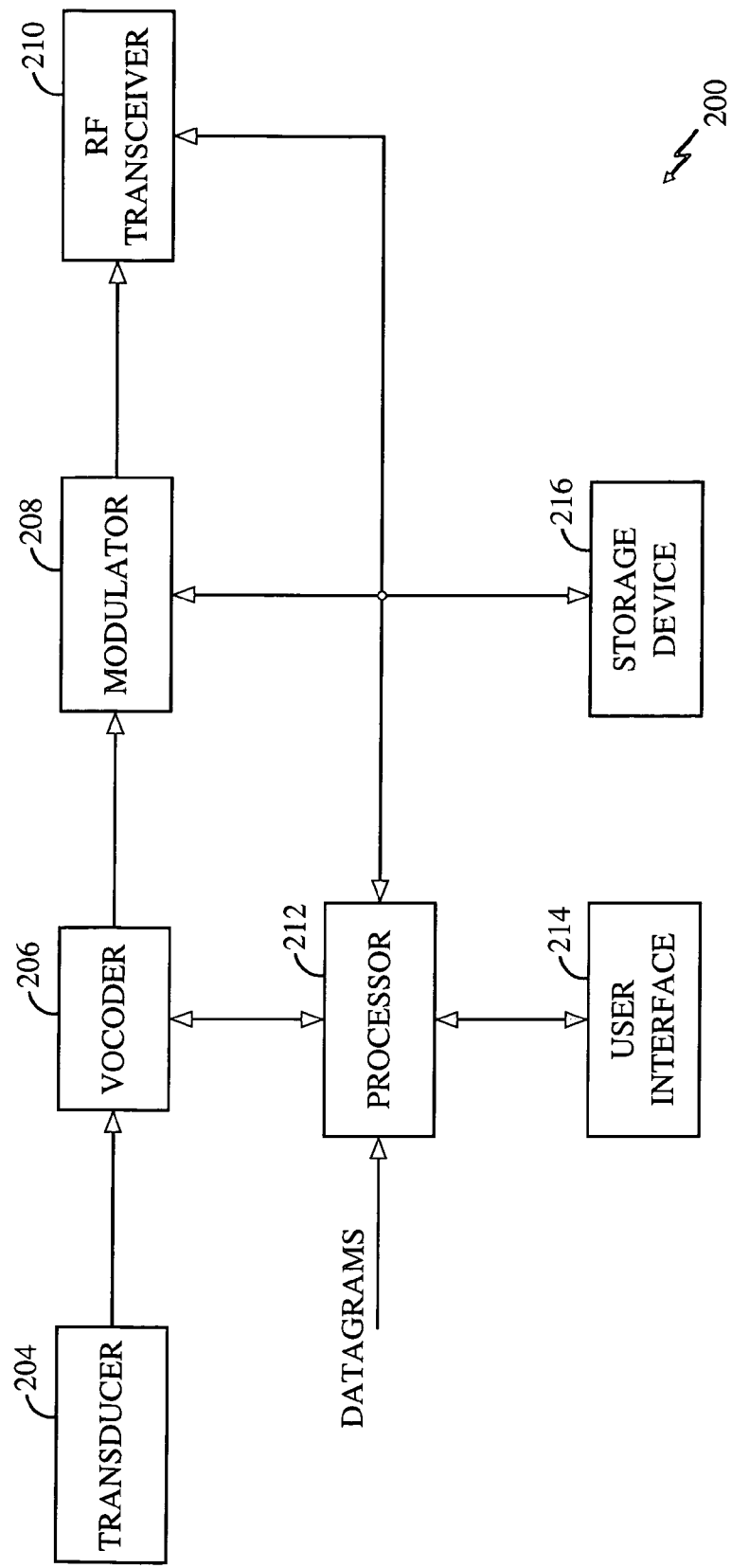
FIG. 2 illustrates a transmitter as used in one embodiment of the method and apparatus for reducing overhead in the wireless communication system of FIG. 1.

FIG. 2 illustrates a transmitter 200 as used in one embodiment of the method and apparatus for reducing overhead in the wireless communication system of FIG. 1. Transmitter 200 typically resides in a WCD 10.

Transmitter 200 is shown in functional block diagram format configured to transmit information in a traditional voice service mode. However, transmitter 200 may also be configured to transmit data, for example using a data service option, or a VOD option, depending on the application or user preference.

In a voice service mode of operation, transducer 204 receives audio information, such as human speech, to be transmitted over the air and eventually to communication device 24, or to a second WCD 10. Transducer 204 comprises a microphone and any necessary electronic circuitry and/or software to convert analog audio information into a digital format. Such techniques are well known in the art.

The digitized audio information is then provided to vocoder 206 where it is converted into vocoder frames, in the case of an audio application. Alternatively, in the case of a video application, the digital data from transducer 204 may be provided to a suitable data compression device in order to minimize the bandwidth necessary for over the air transmission. Such compression devices are also well known in the art.

In another embodiment, no data compression device is used. In this case, digital information from transducer 204 is provided directly to modulator 208. In yet another embodiment, data is provided to modulator 208 either directly or indirectly from a data source, rather than transducer 204. Such may be the case when transmitting non-real-time data such as email or other data files.

In another embodiment, data packets suitable for transmission over data network 20 are generated by, for example, an application running on WCD 10, such as an Internet web-browser, an email application, a digital video camera, and others. In such applications, data packets suitable for transmission over data network 20 are generated, each data packet comprising necessary header information needed to communicate with a destination device. Such header information is referred to interchangeably herein as data network header information. For example, a web-browser operating on WCD 10 may generate IP datagrams, which are data packets formatted for transmission across data network 20, when a user wishes to access a web page. IP datagrams comprise data network header information, for example, header information relating to IP, UDP, TCP, etc.

The datagrams are provided to processor 212 where the header information is stripped away. The remaining information is then re-formatted into a predetermined data protocol for over-the-air transmission to base station 12, the predetermined data protocol generally lacking any data network header information. For example, processor 212 may format the remaining information into one or more vocoder-like frames, each one comprising, in one embodiment, a frame 20 milliseconds in duration, holding a relatively large number of information bits. A vocoder like frame is defined as a frame where virtually all of the frame is devoted to the actual data payload, such as vocoder or video or Internet data, and almost none is devoted to overhead, such as data protocol headers. The advantage of re-formatting the remaining information into vocoder-like frames is that the protocols for transmitting vocoder frames over-the-air are generally already incorporated into transmitter 200 and base station, and also all of the available communications bandwidth is available for transmission of end user data rather being devoted to overhead. 12. Of course, processor 212 may alternatively re-format the remaining information in a form other than vocoder-like frames. These alternative encoding formats are generally well-known in the art.

In any case, the digital data provided to modulator 208 is processed in accordance with the particular modulation scheme used in the wireless communication system. For example, the digital data can be modulated using Code Division Multiple Access (CDMA), Time Division Multiple Access (TDMA), or Global System for Mobile communication (GSM), or other well known modulation schemes. The modulated data is then provided to RF transceiver 210, where it is upconverted and then transmitted to base station 12.

In one embodiment, processor 212 is used to coordinate the activities of the various functional blocks shown in FIG. 2. In another embodiment, much of the processing normally accomplished using processor 212 is transferred into the various functional blocks. Processor 212 may comprise a Digital Signal Processor (DSP) executing a set of computer instructions, a custom ASIC, discreet elements, or other techniques generally known in the art for providing control of the various functions occurring within transmitter 200.

In addition to providing the functionality necessary to transmit information as described above, processor 212 performs other tasks necessary for implementation of the system and method for reducing transmission overhead in the wireless communication system. In accordance with one embodiment, a data service mode of operation or a VOD service mode of operation is implemented without actually generating IP datagrams at transmitter 200. Rather, data is transmitted in frames in accordance with the voice service mode of operation, and converted into IP datagrams at base station 12. By sending data using a voice service mode of operation, header information normally associated with data packets do not have to be transmitted from transmitter 200 to base station 12, thus reducing transmission overhead normally associated with the transmission of data packets in a wireless communication system.

In another embodiment, the data service mode and/or the VOD service mode relies on the generation of IP datagrams at transmitter 200. In this case, header information associated with the IP datagrams is removed by processor 212, and the remaining information is re-formatted for over-the-air transmission using one of any number of well-known over-the-air data protocols.

In order to transmit data in a data service mode or a VOD mode, processor 212 sends a data origination message to base station 12 prior to transmitting information using either the data service option or the VOD service option. The data origination message alerts base station 12 that a communication involving the transmission of data, rather than voice, is about to occur.

Rather than transmit entire IP datagrams over the air to base station 12, the system and method for reducing transmission overhead transmits only the data portion of a datagram and relies on base station 12 to construct a datagram complete with data network header information using information supplied by processor 212. This may be accomplished in one of several ways. The information needed to construct datagrams at base station 12 can be communicated in the data origination message, in the subsequent transmission of actual data, or a combination of both.

In the case of transmitting information needed to generate data network header information in a data origination message, one or more fields comprising a particular data network header may be transmitted in the data origination message. For example, the data origination message may contain at least a destination data network address corresponding to a data device 26 for which communications are intended. The destination data network address may comprise an IP address corresponding to data device 26, such as a computer. Data network header information may then be generated by knowing the destination data network address. Other fields of the various data network headers may be generated using information stored within base station 12, by negotiating with data device 26, or by using other information as provided by WCD 10, as described below.

In another embodiment, the needed information to construct datagrams at base station 12 is transmitted in data sent subsequent to the data origination message. For example, after the data origination message has been transmitted from WCD 10 to base station 12 indicating a forthcoming data communication, subsequent data containing the information necessary to generate data network header information is transmitted. For example, after the data origination message has been transmitted, at least one full datagram, complete with either full, partial, or compressed data network headers, are transmitted to base station 12. Upon receipt of the subsequent data, base station 12 is able to generate data network header information without the need for further header information from WCD 10. In this case, once base station 12 is able to generate data network header information, a message is transmitted from base station 12 to WCD 10 indicating that WCD 10 should begin transmitting information without data network header information.

Finally, in yet another embodiment, a combination of techniques are used. For example, one portion of the information needed to generate datagrams at base station 12 is transmitted in the data origination message, while another needed portion is transmitted in a datagram comprising either full or compressed headers.

The information transmitted by WCD 10 to allow base station 12 to generate data network header information may comprise a single piece of information, such as a destination data address, a destination data address, an IP checksum indication, a type-of-service indication, a total length indication, or any single field comprising a data network header. In another embodiment, more than one type of information is transmitted.

As an example of the first embodiment described above, a user of WCD 10 may want to transmit secure voice information to data device 26 connected to data network 20 using a VOD service option. In this example, data device 26 comprises a secure telephone capable of communicating in a VOD mode of operation. VOD communications are accomplished by encrypting voice information within WCD 10, transmitting the encrypted information over the air to base station 12, then constructing datagrams at base station 12 in accordance with the data origination message provided by processor 212. As the encrypted data is received by base station 12, datagrams suitable for transmission over data network 20 are generated by adding one or more data protocol headers to the received information. Each header corresponds to a particular data protocol used to transmit datagrams across data network 20. In practice, more than one protocol is used. For example, the transmission of real-time data over data network 20 may comprise a TCP protocol, a UDP protocol, and an RTP protocol which are all well-known data protocols. The protocols used to transmit data across data network 20 may be specified by WCD 10 in the data origination message or they may be specified by a processor located within base station 12, as described below.

A data service call or a VOD service call originates at transmitter 200 when a user of WCD 10 chooses to originate such a communication with a destination device, such as a second WCD 10, data device 26, or communication device 24. The destination device will generally have an address which uniquely identifies it on data network 20. Such an address comprises a well known IP address, in the case of data network comprising the Internet, or any other address suited to the particular data network. In an alternative embodiment, the destination device does not have a permanent address assigned to it. In this case, an address must be assigned to the destination device prior to initial contact by the user of WCD 10. This may be accomplished by placing a standard telephone call to the destination device and providing an address at that time.

The user of WCD 10 may initiate a data communication by, for example, using user interface 214 to scroll through an electronic phonebook which is stored in storage device 216. An address corresponding to each person/device is stored in storage device 216 so that when a name/device is chosen by the user, an address is available to processor 212. Alternatively, the user could directly enter an address to WCD 10 using user interface 214 corresponding to the person/device to which communications are desired. In yet another embodiment, a data address is provided automatically by an application operating within WCD 10.

Storage device 216 is generally a non-volatile memory and may comprise one or more individual devices, each for storing information needed for the operation of WCD 10. The information stored in the electronic phonebook is usually presented to the user via user interface 214. User interface 214 comprises a keypad, voice recognition system, or other known device for entering information into WCD 10. User interface 214 additionally comprises a display or an audio system for presenting information to the user. Such user interfaces are well known in the art.

In any case, an address corresponding to the data device to which communications are desired is chosen and provided to processor 212. This address becomes the destination data network address to which a data communication will be initiated.

In one embodiment, storage device 216 additionally stores information pertaining to a protocol stack used during data communications. In one embodiment, the protocols comprise IP, UDP, and RTP, although other protocols or combinations of protocols could be used in the alternative. In another embodiment, information pertaining to each data protocol planned to be used to transmit data packets across data network 20 is stored in storage device 216. Each communication type may have a pre-designated set of protocols associated with it. For example, a first communication type involving error-free transmission may use the IP and TCP protocols. A second communication type involving real-time media may use the IP, UDP, and RTP protocols. When a particular communication type is chosen, either explicitly by the user or automatically by processor 212, a data origination message comprising information pertaining to the predetermined set of data protocols is transmitted to base station 12.

Figure 3:
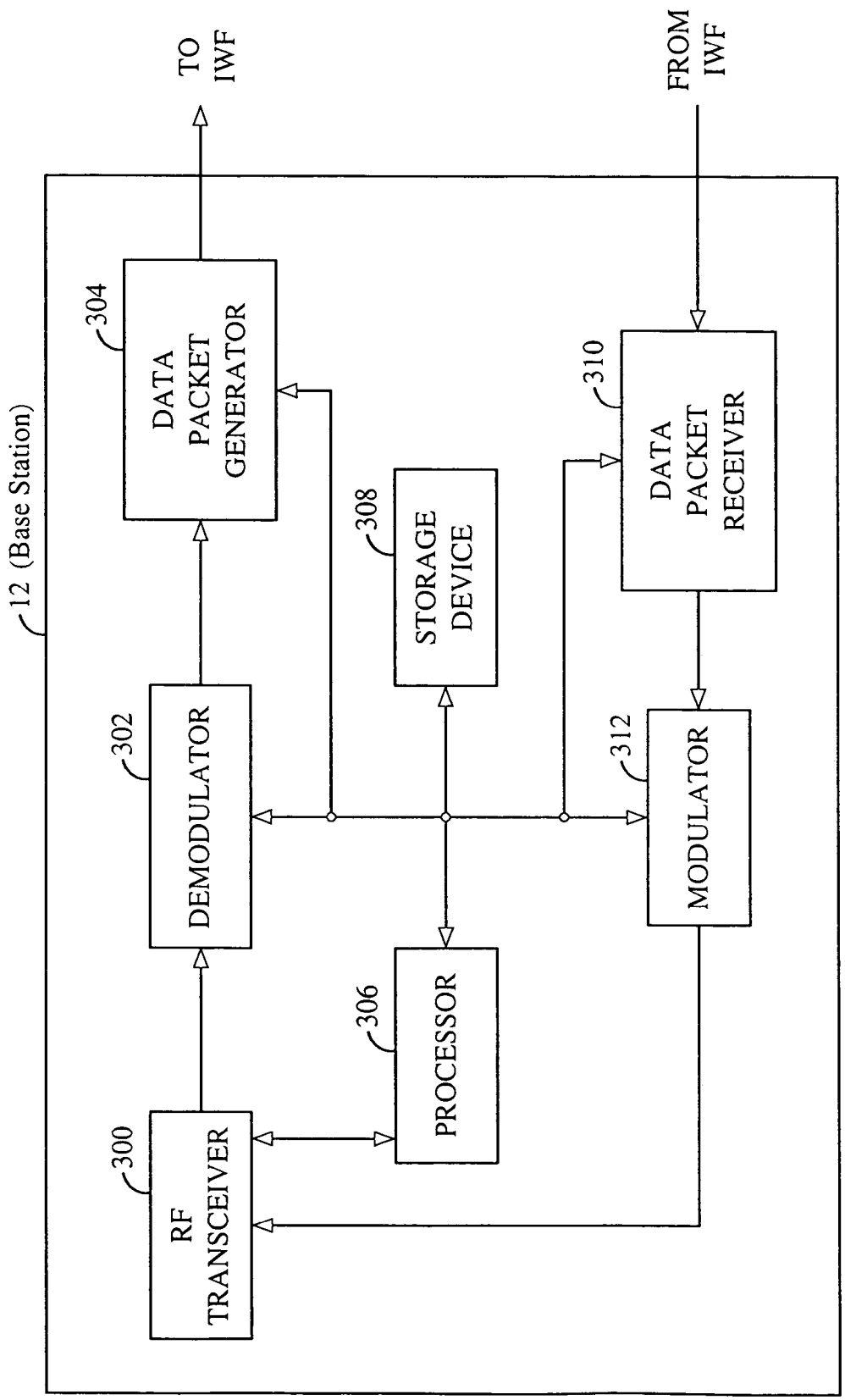
FIG. 3 illustrates a functional block diagram of a base station used in the communication system of FIG. 1.

FIG. 3 illustrates a functional block diagram of base station 12, comprising RF transceiver 300 for transmitting and receiving high-frequency communication signals from WCD 10. Such transceivers are well-known in the art. The resulting signal from RF transceiver 318 is provided to demodulator 302 where it is demodulated in accordance with the particular modulation scheme used by the communication system. In one embodiment, demodulator 302 produces vocoder frames which are then provided to data packet generator 304. In other embodiments, demodulator 302 produces data packets, or simply a stream of digital information corresponding to the information transmitted by WCD 10.

Processor 306 is generally responsible for coordinating the functionality of the various functional blocks in base station 12. Processor 306 comprises a digital signal processor executing computer instructions in one embodiment, although processor 306 could alternatively comprise a custom ASIC, discreet components, or other means known in the art. Alternatively, the functionality of processor 306 could be distributed in several processors within each of the functional blocks detailed in FIG. 3.

When a data origination message or information needed to construct datagrams at base station 12 is received by RF transmitter 300, it is downconverted and then provided to demodulator 302. Demodulator 302 demodulates the information, then provides it to processor 306. Processor 306 stores the information needed to construct datagrams in a storage device 308, such as a destination data network address, or, alternatively, other information regarding the generation of data packets, such as a destination port address, or a payload type. In addition, processor 306 configures data packet generator 304 to communicate with the destination device associated with the destination data network address using one or more data protocols. The data protocols are either predetermined, or they are specified by WCD 10 in the information needed to construct datagrams, or they are determined in an initial communication between base station 12 and the destination device. Processor 306 also performs various other functions upon receipt of the data origination message based on the information contained within the data origination message, such as initializing a communication with the destination data network address specified by the data origination message, if such an address has been provided. Once the initialization is complete, WCD 10 may transmit information to the destination device.

Figure 4:
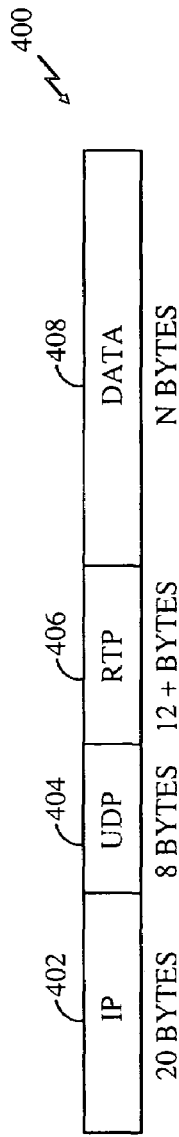
FIG. 4 illustrates a data packet used to transport information in a data network.

After data packet generator 304 has been configured, WCD 10 is free to send information, such as voice or video information, to base station 12. This information is received by RF transceiver 300, and is downconverted and provided to demodulator 302 where the original information transmitted by WCD 10 is recovered. The demodulated information is provided to data packet generator 304, where it is encapsulated into data packets, or datagrams, suitable for transmission over data network 20. This process comprises adding headers to portions of the demodulated information. The header information is provided by processor 306 and storage device 308. For example, if the information needed to construct datagrams specifies a destination data network address of 123.45.4.198 and the use of the IP, UDP, and RTP data protocols, then data packet generator 304 will generate datagrams in accordance with these protocols, using the information stored in storage device 308 as well as data packet generator 304 calculating necessary header values as needed. An illustration of such a datagram is shown in FIG. 4 as datagram 400, comprising data network header information and data 408. In this embodiment, data network header information comprises IP header 402, UDP header 404, RTP header 406.

Figure 5:
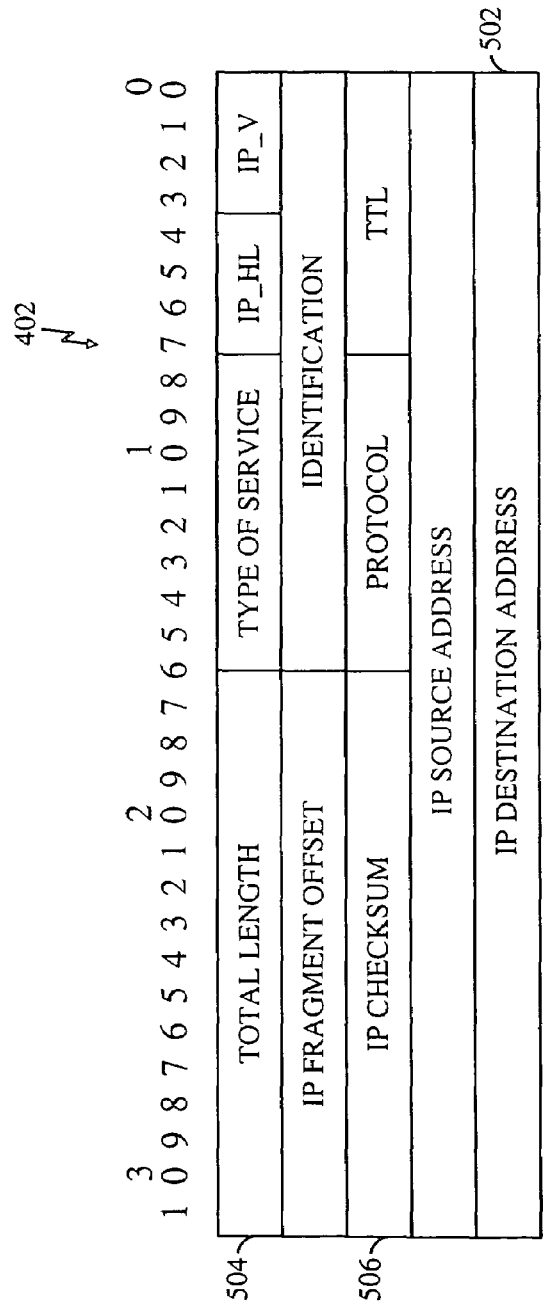
FIG. 5 illustrates the information contained in a typical IP header.

FIG. 5 illustrates the information contained in a standard IP header. IP headers are well-known in the art. IP header 402 in FIG. 5 comprises 20 bytes of data arranged in eleven fields relating to various aspects for the delivery of data from a source to a destination. The IP protocol is a network layer protocol offering a connectionless inter-network service. IP provides features for addressing, type-of-service specification, fragmentation, re-assembly, and security of data packets, and is defined in Request For Comments (RFC) 791. The Internet Request For Comments documents are written definitions of the protocols and policies of the Internet and are readily found on many websites.

In one embodiment, information needed to construct datagrams at base station 12 is transmitted in the data origination message sent by transmitter 200, and comprises at least IP destination data network address 502, discussed above. Other fields may be transmitted as well, or, in alternative embodiments, one or more of the fields may be stored in storage device 308, or the fields may be generated as needed by processor 306. In another embodiment, the information needed to construct datagrams at base station 12 is transmitted in a data frame subsequent to transmission of the data origination message. For example, a datagram complete with data network header information may be formatted at WCD 10 and transmitted to base station 12.

Information in the form of data packets may also be transmitted to WCD 10 from a destination device using a similar process as described above. In this case, data packets, or datagrams, are transmitted from the destination device to IWF 18, or some other device which interfaces data network 20 to base station 12. Each datagram contains a destination data network address corresponding to the particular WCD 10 to which communications are desired. This address typically comprises an IP address.

In one embodiment, IWF 18 maintains a database which associates each registered WCD 10 in the system with a destination data network address, if one has been assigned to a particular WCD 10. In another embodiment, the database containing destination data network addresses are stored in base station 12. When datagrams arrive at IWF 18 (or base station 12), the destination data network address from the datagrams matched against the list of addresses stored in the database. If a match if found, a data origination message is transmitted to WCD 10 indicating that a data communication is available. In one embodiment, the data origination message comprises information which allows WCD 10 to decode subsequent information. For example, the data origination message may instruct processor 212 to decode subsequent information into vocoder frames. In another embodiment, the data origination message comprises information pertaining to the re-creation of IP datagrams. This may include an identification of one or more data protocol headers, such as TCP headers, UDP headers, etc. It may also include one or more parameters which comprise the various data network headers, such as an address corresponding to the destination device, an IP checksum, a total length field, etc. The parameters are stored in storage device 216 for use in re-creating IP datagrams as information is subsequently received from base station 12 and IWF 18. As explained above, the information needed to construct datagrams at WCD 10 may be transmitted in one or more data frames subsequently transmitted from base station 12.

After the data origination message has been received and processed by WCD 10, subsequent information from base station 12 may now be transmitted to WCD 10. As further IP datagrams are received from IWF 18, processor 212 strips away any data network headers associated with the datagrams, leaving remaining information to be transmitted. This information is then re-formatted in accordance with a predetermined data format, such as the creation of vocoder-like frames, described above. The re-formatted information is then modulated using the particular modulation technique used in the communication system, such as CDMA, TDMA, or GSM, then transmitted over the air to WCD 10. WCD 10 receives the information and processes it using well-known techniques to re-create the data transmitted by the destination device, for example, vocoder-like frames.

At this point, the received information, now in the form of re-formatted frames for example, may be used directly by providing the information to a vocoder located within WCD 10. In another embodiment, IP datagrams are re-created within WCD 10 for use in one or more applications which require information to be provided in the form of IP datagrams. In this case, processor 212 re-creates IP datagrams using information stored in storage device 216, including any necessary header information. After the IP datagrams have been created, they may then be provided to the application requiring IP datagrams.

Figure 6:
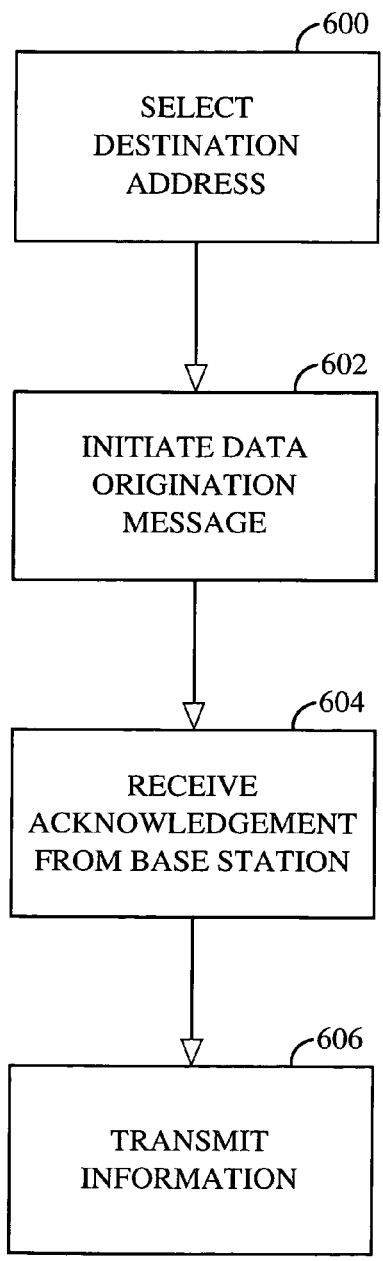
FIG. 6 is a flow diagram illustrating the method of operation a wireless communication device operating in the communication system of FIG. 1.

FIG. 6 is a flow diagram illustrating the method of operation of WCD 10. In step 600, a user of WCD 10 chooses a destination device to communicate with. This may be accomplished by selecting a name from an electronic "phonebook" stored within WCD 10, by manually entering an address using a keypad on WCD 10, or by selecting a web site or email address to connect to using an application running on WCD 10. Other methods well-known in the art may be used in the alternative.

The selection by the user ultimately provides a destination data network address to processor 212 within WCD 10. The destination data network address corresponds to a destination device selected by the user and, in one embodiment, comprises an IP address, which is well-known in the art.

Once the destination data network address is provided to processor 212, a data origination message is generated by processor 212 which initiates communications with base station 12. This is shown as step 602 in FIG. 6. In one embodiment, the data origination message comprises information needed to construct datagrams at base station 12, such as the destination data network address to which communications are sought. In other embodiments, additional information is contained within the data origination message, such as a port address, encryption state information, or the type of information that will be transmitted by WCD 10 (i.e., real-time voice, real-time video, data files, etc), or information specifying the number and type of data protocols to be used during data transmission from base station 12 to the chosen destination device. If protocol information is transmitted by WCD 10, one or more header parameters may additionally be transmitted to further specify how data is to be transmitted across data network 20 once the data reaches base station 12. In yet another embodiment, the information needed to construct datagrams at base station 12 is transmitted in one or more subsequent data frames.

After the information needed to construct datagrams has been transmitted by WCD 10 to base station 12, information may then be transmitted by WCD 10, as shown in step 606. In another embodiment, WCD 10 may not transmit data until an acknowledgement message is received from base station 12, as shown in FIG. 6 as step 604. Acknowledgement messages are well-known in the art. The data transmitted may be any type of information, such as voice, data files, video, email, etc.

Figure 7:
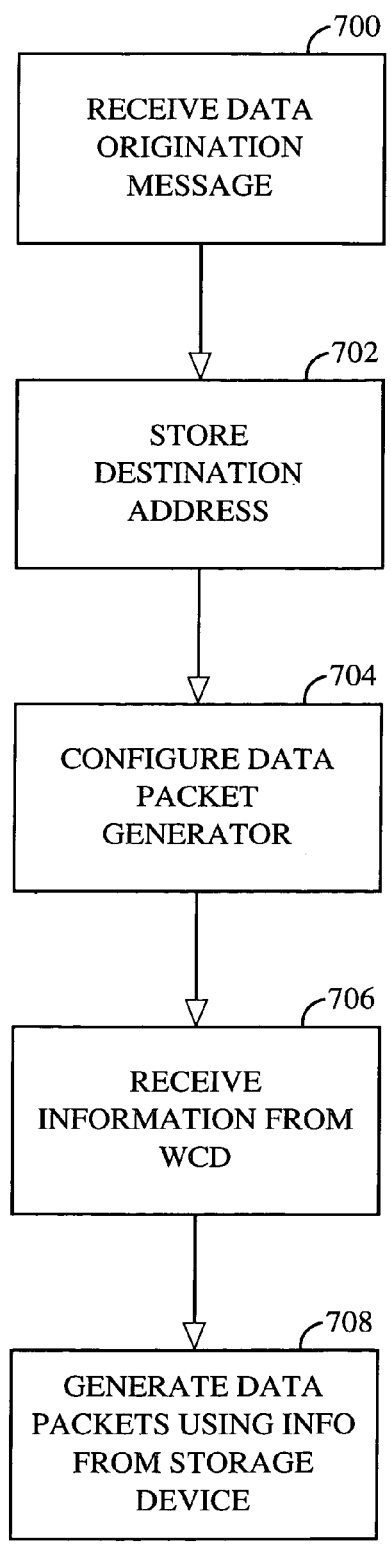
FIG. 7 is a flow diagram illustrating the method of operation of the base station of FIG. 3.

FIG. 7 is a flow diagram illustrating the method of operation of base station 12. In step 700, base station 12 receives a data origination message from WCD 10 and/or information needed to construct datagrams at base station 12. In one embodiment, the data origination comprises at least a destination data network address corresponding to a destination device, such as a computer or to another WCD.

In other embodiments, other information is provided in the data origination message as well, such as a destination port address, or information specifying the number of and type of data protocols to be used by base station 12 when communicating with the desired destination device.

After receiving the information needed to construct datagrams at base station 12 in step 700, information from the message is stored in storage device 308, shown in step 702, for purposes of constructing datagrams. In step 704, processor 306 configures data packet generator 304 to construct datagrams in accordance with either a default set of data protocols, or a set of protocols specified in the information stored in storage device 308. Alternatively, the set of data protocols may be specified by a negotiation between processor 306 and the destination device to which communications are desired.

The configuration of data packet generator 304 comprises providing information for datagram construction, including any required header information. The required header information is stored in storage device 308, or generated as needed by processor 306 and/or data packet generator 304. For example, header information may comprise a source address corresponding to WCD 10, a source port number corresponding to an application operating on WCD 10, a destination data network address corresponding to the destination device, and a port address corresponding to an application operating on the destination device. Of course, other information needed to generate data packets, including header information, may be stored and provided by storage device 308. The generation of datagrams is well-known in the art.

After data packet generator 304 has been configured for operation in step 704, information may now be transmitted from WCD 10 to the destination device. Processor 306 may, in one embodiment, send a message to WCD 10 indicating that data packet generator 304 has been configured for data transmission across data network 20. Information is received from WCD 10 in step 706 and provided to data packet generator 304. Data packet generator 304 generates data packets in accordance with the configuration specified by processor 306, as shown in step 706. As information is provided to data packet generator 304, it is placed into a data packet defined by one or more headers and transmitted across data network 20 to the destination device.

Figure 8:
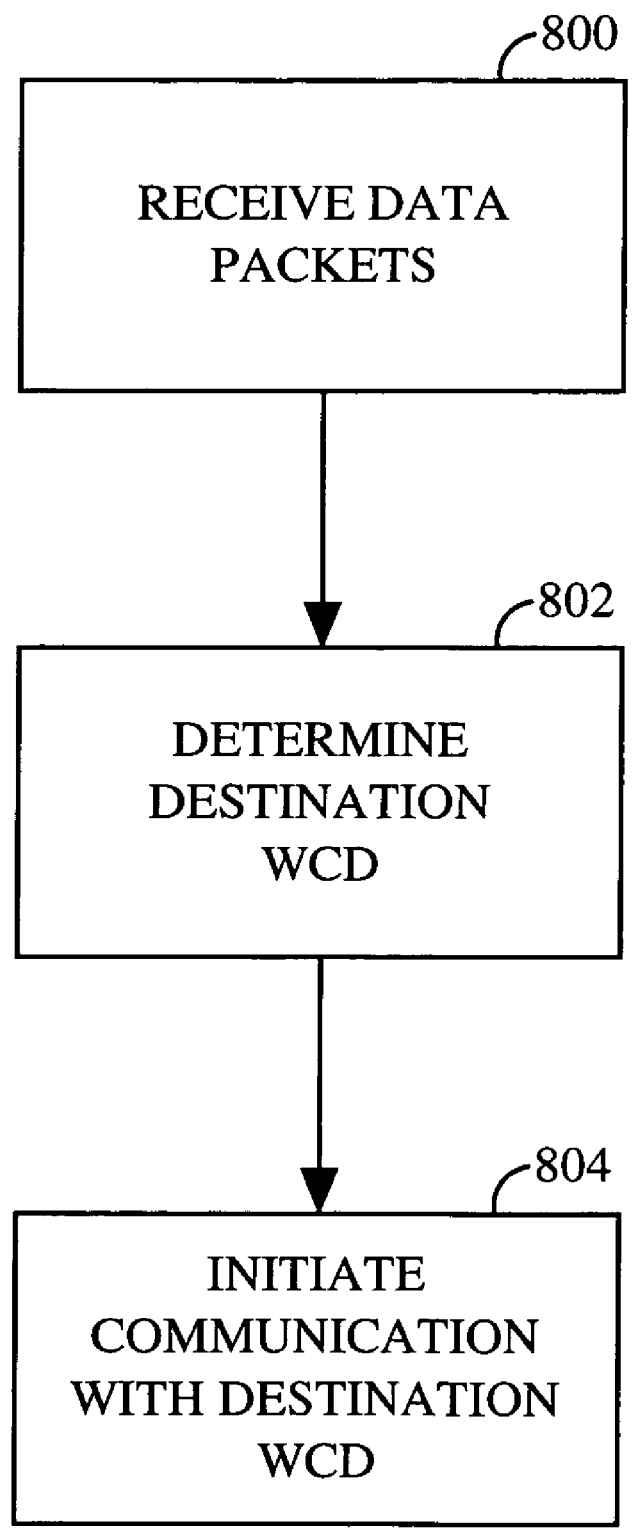
FIG. 8 is a flow diagram illustrating data transmission from a destination device to a wireless communication device operating in the communication system of FIG. 1.

FIG. 8 is a flow diagram illustrating data transmission from a destination device to WCD 10. In step 800, data from the destination data device is received by data packet receiver 310. The data is typically configured into data packets, otherwise known as datagrams, each data packet comprising one or more headers and an information portion.

In step 802, processor 306 determines a destination data network address contained within the one or more the headers associated with a data packet. The destination information in this case identifies a particular WCD 10 to which the data packet is intended. Processor 306 uses the destination data network address provided by the one or more headers and compares the destination data network address to information stored in storage device 308. The information in storage device 308 comprises a destination data network address corresponding to a WCD 10 identification code, typically a telephone number. Processor 306 determines the identity of the desired WCD 10 by looking up the WCD identification number corresponding to the destination data network address provided in the one or more headers.

If a corresponding WCD identification code is found in storage device 308, a communication is initiated with the identified WCD 10, by base station 12 transmitting a data origination message. This is shown in FIG. 8 as step 804. In another embodiment, a data origination message is not necessary, if a communication between WCD 10 and destination device 26 is already "in progress," that is, WCD 10 has already initiated data communications with destination device 26. In this case, WCD 10 already knows how to interpret data being transmitted by base station 12.

If a data origination message is transmitted, it comprises information which allows WCD 10 to decode subsequent information, in one embodiment. In another embodiment, the information to decode subsequent information is transmitted in one or more subsequent data frames. For example, in one embodiment, the data origination message instructs processor 212 to decode subsequent information into vocoder frames. In another embodiment, the data origination message comprises information pertaining to the re-creation of IP datagrams. This may include an identification of one or more data network headers, such as TCP headers, UDP headers, etc. It may also include one or more parameters which comprise the various data network headers, such as an address corresponding to the destination device, an IP checksum, a total length field, etc. The parameters are stored in storage device 216 for use in re-creating IP datagrams as information is subsequently received from base station 12 and IWF 18.

After the data origination message has been received and processed by WCD 10, subsequent information from base station 12 may now be transmitted to WCD 10. As further IP datagrams are received from IWF 18, processor 212 strips away any data network headers associated with the datagrams, leaving remaining information to be transmitted. This information is then re-formatted in accordance with a predetermined data format, such as the creation of vocoder-like frames, described above. The re-formatted information is then modulated using the particular modulation technique used in the communication system, such as CDMA, TDMA, or GSM, then transmitted over the air to WCD 10. WCD 10 receives the information and processes it using well-known techniques to re-create the data transmitted by the destination device, for example, vocoder-like frames.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for reducing transmission overhead in a communication system, comprising:
   a processor for generating a data origination message initiating a data communication with a receiving station and for subsequently formatting information to be transmitted in accordance with a pre-determined format, said pre-determined format lacking data network header information; and
   a transmitter for transmitting said data origination message, information needed to construct data network header information at said receiving station, and said formatted information to said receiving station,
   wherein said processor is further for transmitting at least one full datagram to said receiving station, and further for removing said data network header information from subsequent datagrams prior to formatting if the apparatus receives a message indicating that the transmitter should begin transmitting information without data network header information.

2. An apparatus for reducing transmission overhead in a communication system, comprising:
   means for generating a data origination message, said data origination message initiating a data communication with a receiving station;
   means for formatting information to be transmitted in accordance with a pre-determined format, said pre-determined format lacking data network header information;
   means for transmitting said data origination message, information needed to construct data network header information at said receiving station, and said formatted information to said receiving station; and
   means for transmitting at least one full datagram to said receiving station, and further for removing said data network header information from subsequent datagrams prior to formatting if the apparatus receives a message indicating that the means for transmitting information should begin transmitting information without data network header information.

3. A method for reducing transmission overhead in a communication system, comprising:
   generating a data origination message, said data origination message initiating a data communication with a receiving station;
   formatting information to be transmitted in accordance with a pre-determined format, said pre-determined format lacking data network header information;
   transmitting said data origination message, information needed to construct data network header information at said receiving station, and said formatted information to said receiving station; and
   transmitting at least one full datagram to said receiving station, and further for removing said data network header information from subsequent datagrams prior to formatting if a message is received indicating information without data network header information should be transmitted.

4. A computer-readable medium embodying means for implementing a method for reducing transmission overhead in a communication system, the method comprising:
   generating a data origination message, said data origination message initiating a data communication with a receiving station;
   formatting information to be transmitted in accordance with a pre-determined format, said pre-determined format lacking data network header information;
   transmitting said data origination message, information needed to construct data network header information at said receiving station, and said formatted information to said receiving station; and
   transmitting at least one full datagram to said receiving station, and further for removing said data network header information from subsequent datagrams prior to formatting if a message is received indicating information without data network header information should be transmitted.

5. An apparatus for reducing transmission overhead in a communication system, comprising:
   a processor for generating a data origination message, said data origination message initiating a data communication with a receiving station, said processor further for transmitting information needed to construct data network header information at said receiving station, and for subsequently formatting information to be transmitted in accordance with a pre-determined format, said pre-determined format lacking data network header information;

a receiver for receiving an acknowledgement from said receiving station; and a transmitter for transmitting said formatted information, after receiving said acknowledgement, to said receiving station, wherein said processor is further for removing said data network header information prior to formatting said information; and wherein said processor is further for transmitting at least one full datagram to said receiving station, and further for removing said data network header information from subsequent datagrams prior to formatting if the apparatus receives a message indicating that the transmitter should begin transmitting information without data network header information.

6. A system for reducing transmission overhead in a communication system, comprising:

a communication device, comprising:

a first processor for generating a data origination message, said data origination message initiating a data communication with a receiving station, and for subsequently formatting information to be transmitted in accordance with a pre-determined format, said pre-determined format lacking data network header information;

a transceiver for transmitting said data origination message, information needed to construct datagrams at said receiving station, and said formatted information to a receiving station, wherein said information needed to construct datagrams at said receiving station is transmitted in a data frame subsequent to said data origination message; and said receiving station, comprising;

a transceiver for receiving said information needed to construct datagrams at said receiving station and for providing said information needed to construct datagrams at said receiving station to a second processor;

said second processor for receiving said information needed to construct datagrams at said receiving station, for storing said information needed to construct datagrams at said receiving station in a storage device, and for configuring a data packet generator to generate datagrams to a destination data network address across a data network; and said data packet generator for generating datagrams in accordance with at least one data network protocol, each of said data network protocols having a respective header associated with it, each of said headers comprising information obtained from at least said storage device; and wherein said first processor is further for transmitting at least one full datagram to said receiving station, and further for removing said data network header information from subsequent datagrams prior to formatting if the communication device receives a message indicating that the transceiver should begin transmitting information without data network header information.

7. A method for reducing transmission overhead in a communication system, comprising:

generating a data origination message, said data origination message initiating a data communication with a receiving station;

transmitting said data origination message to said receiving station;

transmitting information needed to construct data network header information at said receiving station;

formatting information to be transmitted to a destination device in accordance with a pre-determined data format, said pre-determined data format lacking data network header information transmitting said formatted information to said receiving station; and wherein said transmitting comprises transmitting at least one full datagram to said receiving station, and removing said data network header information from subsequent datagrams prior to formatting if a message is received indicating information without data network header information should be transmitted.

8. A method for reducing transmission overhead in a communication system, comprising:

generating a data origination message, said data origination message initiating a data communication with a receiving station;

transmitting said data origination message to said receiving station;

transmitting information needed to construct data network header information at said receiving station;

formatting information to be transmitted to a destination device in accordance with a pre-determined data format, said pre-determined data format lacking data network header information;

receiving an acknowledgement from said receiving station; and transmitting said formatted information to said receiving station after receiving said acknowledgement, wherein said acknowledgement indicates that a data packet generator at said receiving station is configured for sending information to said destination device; and wherein said transmitting comprises transmitting at least one full datagram to said receiving station, and removing said data network header information from subsequent datagrams prior to formatting if a message is received indicating information without data network header information should be transmitted.

9. A method for reducing transmission overhead in a communication system, comprising:

generating a data origination message, said data origination message initiating a data communication with a receiving station;

transmitting said data origination message to said receiving station;

transmitting information needed to construct datagrams at said receiving station;

formatting information to be transmitted to a destination device in accordance with a pre-determined data format, said pre-determined data format lacking data network header information;

transmitting said formatted information to said receiving station, wherein said information needed to construct datagrams at said receiving station is transmitted in a data frame subsequent to said data origination message;

receiving said information needed to construct datagrams at said receiving station by said receiving station;

storing said information needed to construct datagrams at said receiving station in a storage device;

configuring a data packet generator to generate datagrams in accordance with said information needed to construct datagrams at said receiving station, each of said datagrams comprising one or more data network headers, said data network headers constructed using at least said information stored in said storage device;

receiving said formatted information from said communication device to be transmitted across said data network;

constructing datagrams in accordance with said data packet generator configuration;

sending said datagrams across said data network to a destination data network address; and wherein said transmitting comprises transmitting at least one full datagram to said receiving station, and removing said data network header information from subsequent datagrams prior to formatting if a message is received indicating information without data network header information should be transmitted.

10. A method for reducing transmission overhead in a communication system, comprising:

receiving a data origination message from a communication device, said data origination message initiating a data communication with a receiving station;

transmitting a message to the communication device, said message indicating information without data network header information should be transmitted;

receiving information needed to construct datagrams at said receiving station;

storing said information needed to construct datagrams at said receiving station in a storage device;

configuring a data packet generator for transmitting datagrams across a data network to a destination device, said datagrams formatting in accordance with at least one data network protocol, said datagrams each comprising at least one data network header, said at least one data network header formed from information stored in said storage device;

receiving formatted information from said communication device to be transmitted to said destination device, said formatted information lacking data network header information;

constructing datagrams in accordance with said data packet generator configuration;

transmitting said datagrams to said destination device across said data network;

wherein said information needed to construct datagrams at said receiving station is transmitted in a data frame subsequent to said data origination message; and wherein said receiving formatted information comprises receiving at least one full datagram, and said data network header information is removed from subsequent datagrams prior to formatting in accordance with the message previously transmitted to the communication device.

11. A processor for reducing transmission overhead in a communication system, comprising:

means for generating a data origination message, said data origination message initiating a data communication with a receiving station;

means for formatting information to be transmitted in accordance with a pre-determined format, said pre-determined format lacking data network header information;

means for transmitting said data origination message, information needed to construct data network header information at said receiving station, and said formatted information to said receiving station; and means for transmitting at least one full datagram to said receiving station, and further for removing said data network header information from subsequent datagrams prior to formatting if a message is received indicating information without data network header information should be transmitted.

* * * * *